United States Patent
Choi et al.

(10) Patent No.: US 11,657,237 B2
(45) Date of Patent: May 23, 2023

(54) ELECTRONIC DEVICE AND NATURAL LANGUAGE GENERATION METHOD THEREOF

(71) Applicant: Samsung Electronics Co., Ltd., Suwon-si (KR)

(72) Inventors: Hyungtak Choi, Suwon-si (KR); Heesik Jeon, Suwon-si (KR); Jihie Kim, Suwon-si (KR); Haehun Yang, Suwon-si (KR); Inchul Hwang, Suwon-si (KR); Seungsoo Kang, Suwon-si (KR); Hyunwoo Park, Suwon-si (KR); Daye Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

(21) Appl. No.: 16/966,249

(22) PCT Filed: Jan. 28, 2019

(86) PCT No.: PCT/KR2019/001164
§ 371 (c)(1),
(2) Date: Jul. 30, 2020

(87) PCT Pub. No.: WO2019/164144
PCT Pub. Date: Aug. 29, 2019

(65) Prior Publication Data
US 2021/0049328 A1    Feb. 18, 2021

(30) Foreign Application Priority Data

Feb. 22, 2018 (KR) .................. 10-2018-0021320

(51) Int. Cl.
*G06F 17/00* (2019.01)
*G06F 40/30* (2020.01)
*G06F 40/56* (2020.01)

(52) U.S. Cl.
CPC .............. *G06F 40/30* (2020.01); *G06F 40/56* (2020.01)

(58) Field of Classification Search
None
See application file for complete search history.

(56) References Cited

U.S. PATENT DOCUMENTS 7,020,607 B2    3/2006   Adachi
8,190,263 B2    5/2012   Machado et al.
(Continued)

FOREIGN PATENT DOCUMENTS

JP    2002-023783 A    1/2002
JP    5807891 B2    11/2015
(Continued)

OTHER PUBLICATIONS

Practical Natural Language Generation for Spoken Dialogue System, 2018.
(Continued)

*Primary Examiner* — Satwant K Singh
(74) *Attorney, Agent, or Firm* — Jefferson IP Law, LLP

(57) ABSTRACT

Provided in the present disclosure are an electronic device and a natural language generation method thereof. The natural language generation method of the electronic device comprises: obtaining input data with information on a plurality of slots included for generating a response; obtaining a natural language corresponding to the input data by inputting the information on the plurality of slots to one of artificial intelligence models trained for obtaining a natural language generation template and a natural language; and
(Continued)

outputting the obtained natural language. In particular, at least a part of a method for obtaining a natural language in order to provide a response can use an artificial intelligence model having learned according at least one of machine learning, a neural network, or a deep-learning algorithm

11 Claims, 14 Drawing Sheets

(56) References Cited

U.S. PATENT DOCUMENTS

| | | | |
|---|---|---|---|
| 9,031,844 B2 | 5/2015 | Yu et al. | |
| 9,336,772 B1 | 5/2016 | Salvador et al. | |
| 9,635,178 B2 | 4/2017 | Raanani et al. | |
| 9,747,556 B2 | 8/2017 | Garrison et al. | |
| 9,785,717 B1 | 10/2017 | DeLuca | |
| 9,842,585 B2 | 12/2017 | Huang et al. | |
| 10,740,371 B1* | 8/2020 | Mars | G06K 9/6215 |
| 2002/0038213 A1 | 3/2002 | Adachi | |
| 2002/0161587 A1 | 10/2002 | Pitts, III et al. | |
| 2012/0156660 A1 | 6/2012 | Kwon et al. | |
| 2019/0130244 A1* | 5/2019 | Mars | G10L 15/18 |
| 2020/0193265 A1* | 6/2020 | Hill | G06N 3/084 |
| 2021/0256345 A1* | 8/2021 | Mars | G06N 5/022 |

FOREIGN PATENT DOCUMENTS

| | | |
|---|---|---|
| KR | 10-2006-0064533 A | 6/2006 |
| KR | 10-2006-0070605 A | 6/2006 |
| KR | 10-2009-0058320 A | 6/2009 |
| KR | 10-2012-0075585 A | 7/2012 |
| KR | 10-1117298 B1 | 7/2012 |
| KR | 10-1587023 B1 | 1/2016 |
| KR | 10-2016-0049210 A | 5/2016 |
| KR | 10-1768852 B1 | 8/2017 |

OTHER PUBLICATIONS

Korean Notice of Allowance dated Sep. 13, 2022, issued in Korean Application No. 10-2018-0021320.
Korean Office Action dated Jun. 23, 2022, issued in Korean Application No. 10-2018-0021320.

* cited by examiner

FIG. 6

It remains 1 hour and 30 minutes.
hour      min
[hide(hour=0)]  [hide(min=0)]

ELECTRONIC DEVICE AND NATURAL LANGUAGE GENERATION METHOD THEREOF

TECHNICAL FIELD

The disclosure relates to an electronic device and a natural language generation method thereof, and more specifically to an electronic device capable of providing a response to a user input from a dialogue system to a natural language and a natural language generation method thereof.

In addition, the disclosure relates to an artificial intelligence (AI) system which utilizes a machine learning algorithm to simulate the functions of recognition, identification, and the like of a human brain and an application thereof.

BACKGROUND ART

Recently, artificial intelligence (AI) systems implementing an intelligence level of a human are being used in various fields. The AI system, unlike the conventional rule-based smart system, are systems in which machines self-learn and identify, thus becoming smarter. The AI system may be configured so that the more the AI system is used, the rate of recognition is improved and user preference is more accurately understood, and thus the conventional rule-based smart systems are being gradually substituted with a deep learning-based artificial intelligence system.

The artificial intelligence technology may consist of machine learning (e.g., deep learning) and element technologies utilizing machine learning.

The machine learning may be an algorithm technology that self-classifies and learns features of input data, and element technologies may be a technology which utilizes machine learning algorithm such as deep learning to simulate functions such as recognition, identification, and the like of the human brain, and may be constituted in the technical fields of linguistic understanding, visual understanding, inference/prediction, knowledge representation, movement control, and the like.

The various fields that the artificial intelligence technology may be applied are as follows. Linguistic understanding refers to a technology that recognizes human language/character and applies/processes the same, and may include natural language processing, machine translation, dialogue system, questions and answers, speech recognition/synthesis, and the like. Visual understanding refers to a technology that recognizes objects as human vision, and may include object recognition, object tracking, image searching, human recognition, scene understanding, spatial understanding, image enhancement, and the like. Inference/prediction refers to a technology that determines information and logically infers and predicts the information, and may include knowledge/probability based inference, optimization prediction, preference based planning, recommendation, and the like. Knowledge representation refers to a technology that automatically processes human experience information to knowledge data, and may include knowledge construction (e.g., data generation/classification), knowledge management (e.g., data utilization), and the like. Movement control refers to a technology that controls movement of an autonomous driving of a vehicle, movement of a robot, and the like, and may include movement control (e.g., navigation, collision, driving), manipulation control (e.g., behavior control), and the like.

Recently, various corporations are using artificial intelligence model to provide a dialogue system capable of providing a response to user input (i.e., user speech). The dialog system commonly include an automatic speech recognition (ASR) module, a natural language understanding (NLU) module, a dialogue management (DM) module, a natural language generation module, and a text-to-speech module.

In order for electronic devices to use dialogue systems to provide optimum responses to users, the processing results of each of the above-described modules need to be accurate. Specifically, for a natural conversation between a human and an electronic device, the natural language generation module needs to generate an optimized natural language responding to the user speech. If the natural language generation module provides an abnormal or an awkward response, the problems of the usability of the dialogue system decreasing may arise. Accordingly, the natural language generation module generating a natural language including an accurate response has become a matter of great importance in the dialogue system.

The conventional natural language generation module used a natural language generation template to generate natural language. However, when the natural language generation module uses the natural language generation template to generate a natural language, there is the problem of natural language generation templates of many cases being required for various situations to provide various responses.

DISCLOSURE

Technical Problem

The disclosure provides an electronic device capable of generating a natural language including a response to user input by inputting input data including a plurality of slots to one of the trained artificial intelligence models to obtain a natural language generation template and a natural language in order to provide an accurate response to various cases, and a natural language generation method thereof.

Technical Solution

According to an embodiment of the disclosure, a natural language generation method of an electronic device includes obtaining input data included with information on a plurality of slots for generating a response; obtaining a natural language corresponding to the input data by inputting information on the plurality of slots to one of artificial intelligence models trained for obtaining a natural language generation template and a natural language; and outputting the obtained natural language.

The obtaining may include, identifying whether a natural language generation template corresponding to the input data is present based on information on the plurality of slots; and based on a natural language generation template corresponding to the input data being present, using the natural language generation template to obtain a natural language for the input data.

In addition, based on a natural language generation template corresponding to the input data not being present, the obtaining a natural language for the input data by inputting information on the plurality of slots to the artificial intelligence model may be further included.

The obtaining may further include, based on a natural language generation template corresponding to the input data not being present, using a similar template that is most similar to a natural language generation template corresponding to the input data among pre-stored natural language generation templates to obtain a first natural language for the input data; obtaining a second natural language for the input data by inputting information on the plurality of slots to the artificial intelligence learning model; and calculating a score of the first natural language and the second natural language to obtain a natural language with a high score between the first natural language and the second natural language as natural language for the input data.

In addition, the obtaining may include, based on the scores on the first natural language and the second natural language both being less than the threshold value, obtaining a natural language for the input data by using a defaulted natural language generation template.

The artificial intelligence model may be trained to obtain a natural language on a learning data including a number of slots greater than n-number of slots by using the learning data including the number of slots greater than the n-number of slots included in the natural language generation template.

The natural language generation template may be generated by inputting learning data including information on n-number of slots to the artificial intelligence model for the natural language on the obtained learning data to be templated.

According to an embodiment of the disclosure, an electronic device includes a memory including at least one instruction; and a processor configured to connected to the memory and control the electronic device, and the processor is configured to, based on executing at least one instruction, obtain input data including information on a plurality of slots for generating a response, obtain a natural language corresponding to the input data by inputting the information on the plurality of slots to one of the artificial intelligence models trained for obtaining the natural language generation template and the natural language stored in the memory, and output the obtained natural language.

The processor may identify whether a natural language generation template corresponding to the input data is present based on information on the plurality of slots, and based on a natural language generation template corresponding to the input data being present, use the natural language generation template to obtain a natural language for the input data.

The processor may, based on a natural language generation template corresponding to the input data not being present, input information on the plurality of slots to the artificial intelligence model to obtain a natural language for the input data.

The processor may, based on a natural language generation template corresponding to the input data not being present, use a similar template that is most similar to the natural language generation template corresponding to the input data among the pre-stored natural language generation templates to obtain a first natural language for the input data, input information on the plurality of slots to the artificial intelligence learning model to obtain a second natural language for the input data, calculate a score on the first natural language and the second natural language to obtain a natural language of a high score between the first natural language and the second natural language as a natural language for the input data.

The processor may, based on the scores on the first natural language and the second natural language both being less than a threshold value, use a defaulted natural language generation template to obtain a natural language for the input data.

The artificial intelligence model may be trained to use learning data including a number of slots greater than n-number of slots included in the natural language generation template to obtain a natural language on learning data including a number of slots greater than the n-number of slots.

The natural language generation template may be generated by inputting learning data including information on n-number of slots to the artificial intelligence model for the natural language on the obtained learning data to be templated.

According to an embodiment of the disclosure, a computer readable recording medium storing a program for executing a natural language generating method includes obtaining input data included with information on a plurality of slots for generating a response; obtaining a natural language corresponding to the input data by inputting the information on the plurality of slots to one of the artificial intelligence models trained for obtaining a natural language generation template and a natural language; and outputting the obtained natural language.

Effect of Invention

According to the various embodiments described above, because the electronic device may provide a more accurate response to user input of various situations, the usability of a dialogue system may be increased.

DESCRIPTION OF DRAWINGS

FIGS. 4 to 6 are diagrams illustrating a tool platform included in a natural language generator according to an embodiment of the disclosure;

DETAILED DESCRIPTION OF EXEMPLARY EMBODIMENTS

Figure 1:
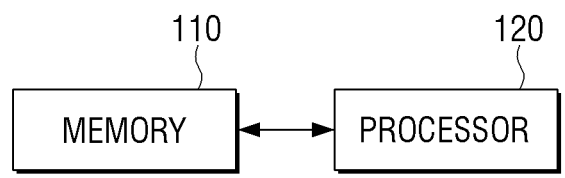
FIG. 1 is a block diagram briefly illustrating a configuration of an electronic device according to an embodiment of the disclosure.

Various embodiments herein will be disclosed with reference to the accompanying drawings. However, it should be noted that the various embodiments are not for limiting the scope of the disclosure to a specific embodiment, but they should be interpreted to include all modifications, equivalents or alternatives of the embodiments included in the ideas and the technical scopes disclosed herein. With respect to the description of the drawings, like reference numerals may be used for like elements.

Expressions such as "comprise," "may comprises," "consist," or "may consist" and the like herein may designate a presence of a characteristic (e.g., number, function, operation or an element such as a component, and not preclude a presence of other characteristics.

In the disclosure, expressions such as "A or B," "at least one of A and/or B"," or "one or more of A and/or B" may include all possible combinations of the items listed together. For example, "A or B," "at least one of A and B," or "at least one of A or B" may refer to all cases including (1) at least one of A, (2) at least one of B, or (3) both at least one of A and at least one of B.

Expressions such as "first," "second" or so on used in the disclosure may modify various elements regardless of order and/or importance, and may be used only to distinguish one element from another, but does not limit the corresponding elements.

When a certain element (e.g., first element) is indicated as being "(operatively or communicatively) coupled with/to" or "connected to" another element (e.g., second element), it may be understood as the certain element being directly coupled with/to the other element or as being coupled through still another element (e.g., third element). On the other hand, when a certain element (e.g., first element) is indicated as "directly coupled with/to" or "connected to" another element (e.g., second element), it may be understood as still another element (e.g., third element) not being present between the certain element and the other element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware. Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The electronic device according to the various embodiments may include at least one of, for example, a smartphone, a tablet personal computer (PC), a mobile phone, a video phone, a e-book reader, a desktop PC, a laptop PC, a netbook computer, a work station, a server, a personal digital assistant (PDA), a portable multimedia player (PMP), an MP3 player, a medical device, a camera, or a wearable device. A wearable device may include at least one of an accessory type (e.g., a watch, a ring, a bracelet, an anklet, a necklace, a pair of glasses, a contact lens or a head-mounted-device (HMD)), a fabric or a garment-embedded type (e.g., an electronic clothing), a body-attached type (e.g., a skin pad or a tattoo), or a bio-implantable circuit. In some embodiments, the electronic device may include at least one of, for example, a television, a digital video disk (DVD) player, an audio, a refrigerator, a cleaner, ab oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAY-STATION™, etc.), an electronic dictionary, an electronic key, a camcorder, or an electronic frame.

In another embodiment, the electronic device may include at least one of various medical devices (e.g., various portable medical measurement device (e.g., glucose measuring device, a heart rate measuring device, a blood pressure measuring device, a temperature measuring device, etc.), a navigation device, a global navigation satellite system (GNSS), an event data recorder (EDR), a flight data recorder (FDR), a vehicle infotainment device, a nautical electronic equipment (e.g., nautical navigation device, gyro compass, etc.), an avionics electronic device, a security device, a vehicle head unit, an industrial or personal robot, a drone, an automated teller machine (ATM) of financial institutions, a point of sales (POS) of shops, or internet of things device (e.g., light bulbs, various sensors, sprinkler devices, fire alarms, temperature adjusters, street lights, toasters, exercise equipment, hot water tanks, heater, boilers, etc.)).

In this disclosure, the term "user" may refer to a person using an electronic device or a device (e.g., artificial intelligence electronic device) that uses an electronic device.

The disclosure will be described in greater detail below with reference to the accompanying drawings. FIG. 1 is a block diagram briefly illustrating a configuration of an electronic device according to an embodiment of the disclosure. As illustrated in FIG. 1, the electronic device 100 may include a memory 110 and a processor 120.

The memory 110 may store instructions related to at least one other element of the electronic device 100. Specifically, the memory 110 may be implemented as a non-volatile memory, a volatile memory, a flash-memory, a hard disk drive (HDD), a solid state drive (SSD), or the like. The memory 110 may be accessed by the processor 120, and the reading/recording/modifying/updating and the like of data may be performed by the processor 120. The term memory in the disclosure may include a memory 110, a read only memory (ROM, not shown) within the processor, a random access memory (RAM, not shown), or a memory card (not shown, e.g., micro SD card, memory stick) mounted to the electronic device 110. In addition, the memory 110 may be stored with programs for configuring various screens to be displayed in the display area of the display (120) and data and the like.

Figure 2:
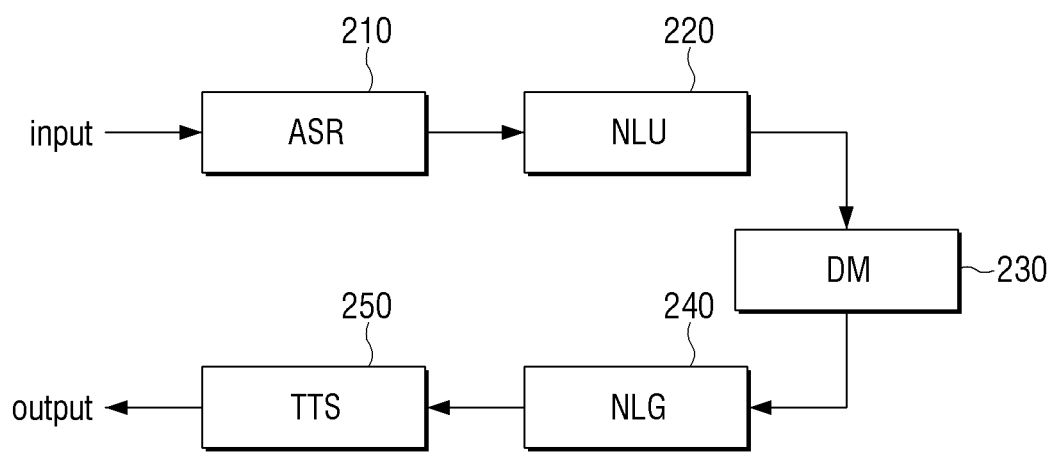
FIG. 2. is a block diagram illustrating a configuration included in a dialogue system according to an embodiment of the disclosure.

In addition, the memory 110 may store a dialogue system providing a response to user input (i.e., specifically, user speech). As illustrated in FIG. 2, the dialogue system may include an automatic speech recognizer (ASR) 210, a natural language understanding (NLU) part 220, a dialogue manager (DM) 230, a natural language generator (NLG) 240, and a text-to-speech (TTS) 250.

The automatic speech recognizer 210 may perform speech recognition on user voice input through a microphone and the like. The NLU part 220 may comprehend intent and entity of user speech based on voice recognition results. The dialogue manager 230 may obtain information on a response to user speech based on natural language understanding results. The dialogue manager 230 may obtain information on a plurality of slots for generating a response. The natural language generator 240 may, as a response to user speech based on information on a plurality of slots obtained through the dialogue manager 230, obtain a natural language. The TTS 250 may convert the obtained natural language to speech. Accordingly, the dialogue system may provide a response to a user speech in voice, and the user may carry out a dialogue with the electronic device 100.

The natural language generator 240 according to an embodiment may input information on a plurality of slots to one of a natural language generation template and an artificial intelligence model to obtain a natural language as a response to user speech.

In addition, the memory 110 may store an artificial intelligence (AI) agent for operating the dialogue system. Specifically, the electronic device 100 may use the artificial intelligence agent for generating a natural language as a response to user speech. The artificial intelligence agent, as a dedicated program for providing an artificial intelligence based service (e.g., voice recognition service, personal assistant service, translation service, search service, etc.), may be executed by a conventional generic-purpose processor (e.g., CPU) or a separate AI dedicated processor (e.g., GPU, etc.). Specifically, the artificial intelligence agent may control the various modules to be described hereafter.

Specifically, the artificial intelligence agent may operate based on a user speech being input. Then, the artificial intelligence agent may obtain information on multiple slots for providing a response by understanding user speech and input the obtained information on the plurality of slots to the artificial intelligence learning model to obtain a natural language.

If a user speech (i.e., specifically, a trigger speech for executing an artificial intelligence function) is input or if a pre-set button (i.e., a button for executing a personal assistant function of the artificial intelligence) is selected, the artificial intelligence agent may operate. Alternatively, the artificial intelligence agent may be in a pre-executed state prior to the user speech being input or the pre-set button being selected. In this case, the artificial intelligence agent of the electronic device 100 may obtain a natural language in response to the user speech after the user speech is input or the pre-sent button is input. In addition, the artificial intelligence agent may be in a standby state prior to the user speech being input or the pre-set button being selected. The standby state refers to a state which detects a pre-defined user input being received to control an operation start of the artificial intelligence agent. If the user speech is input or the pre-set button is selected while the artificial intelligence agent is in the standby state, the electronic device 100 may operate the artificial intelligence agent and obtain a natural language as a response to the user speech. The artificial intelligence agent may control the various modules to be described hereafter, which will be described in detail below.

In addition, according to an embodiment, an artificial intelligence model trained to generate (or obtain) a natural language may be stored. In the disclosure, the trained artificial intelligence model may be constructed considering the application field of the artificial intelligence model, the computer performance of the device, or the like. For example, the artificial intelligence model may be trained to use information on the plurality of slots as input data to obtain a natural language. In order to generate a natural-sounding natural language, the trained artificial intelligence model may be, for example, a model based on a neural network. The artificial intelligence model may be designed to simulate a human brain structure on a computer, and may include a plurality of network nodes which simulate neurons in the human neural network and has weighted value. The plurality of network nodes may respectively form a connection relationship for the neurons to simulate a synaptic activity of a neuron transmitting and receiving a signal through a synapse. In addition, a document summary model may, for example, include a neural network model or a deep learning model developed from a neural network model. The plurality of network nodes in the deep learning model may be positioned at different depths (or, layers) from one another and may transmit and receive data based on a convolution connection relationship. As an example of a trained artificial intelligence model, a deep neural network (DNN), a recurrent neural network (RNN), a bidirectional recurrent deep neural network (BRDNN), and the like may be included, but is not limited thereto.

The artificial intelligence model may use information on the plurality of slots as input data to generate a natural language, but this is merely one embodiment, and may generate a natural language generation template for generating a natural language.

In addition, in the above-described embodiment, although the artificial intelligence model has been described as being stored in the electronic device 100, this is merely one embodiment, and the artificial intelligence model may be stored at a different electronic device.

The processor 120 may be electrically coupled to the memory 110 and may control the overall operation and function of the electronic device 100. Specifically, the processor 120 may obtain input data in which information on the plurality of slots for generating a response is included by executing at least one instruction, obtain a natural language corresponding to the input data by inputting information on the plurality of slots to one of a natural language generation template stored in the memory 110 and an artificial intelligence model trained to obtain a natural language, and output the obtained natural language. Information on the slot may include information corresponding to an entity for constructing a natural language.

Specifically, the processor 120 may identify whether a natural language generation template corresponding to input data is present based on information on the plurality of slots. For example, if the plurality of slots is a "device" and a "location," the processor 120 may identify whether a natural language generation template consisting of a "device" and a "location" is present.

If the natural language generation template corresponding to input data is present, the processor 120 may obtain a natural language for the input data by using the natural language generation template. The natural language generation template may be a template capable of generating a natural language by inputting information on the plurality of slots to a pre-made sentence structure. In addition, the natural language generation template may be pre-generated by the user, but this is merely one embodiment, and may be generated by inputting learning data which includes information on n-number of slots to the artificial intelligence model for the natural language on the obtained learning data to be templated.

If a natural language generation template corresponding to the input data is not present, the processor 120 may obtain a natural language for the input data by inputting information on the plurality of slots to the artificial intelligence model. The trained artificial intelligence model may be trained to use learning data which includes a number of slots greater than n-number of slots included in the natural language generation template to obtain a natural language on the learning data including a number of slots greater than n-number of slots.

Specifically, if a natural language generation template corresponding to the input data is not present, the processor 120 may use a similar template that is most similar to the natural language generation template corresponding to the input data among the pre-stored natural language generation templates to obtain a first natural language for the input data, and input information on the plurality of slots to the artificial intelligence learning model to obtain a second natural language for the input data. Further, the processor 120 may calculate a score on the first natural language and the second natural language to obtain a natural language with a high score between the first natural language and the second natural language as a natural language for the input data. If the scores on the first natural language and the second natural language are both less than a threshold value, the processor 120 may obtain a natural language for the input data by using a defaulted natural language generation template.

The method of obtaining a natural language by the natural language generator 240 and the method of training the artificial intelligence model for obtaining a natural language will be described herein with reference to the accompanying drawings.

Figure 3:
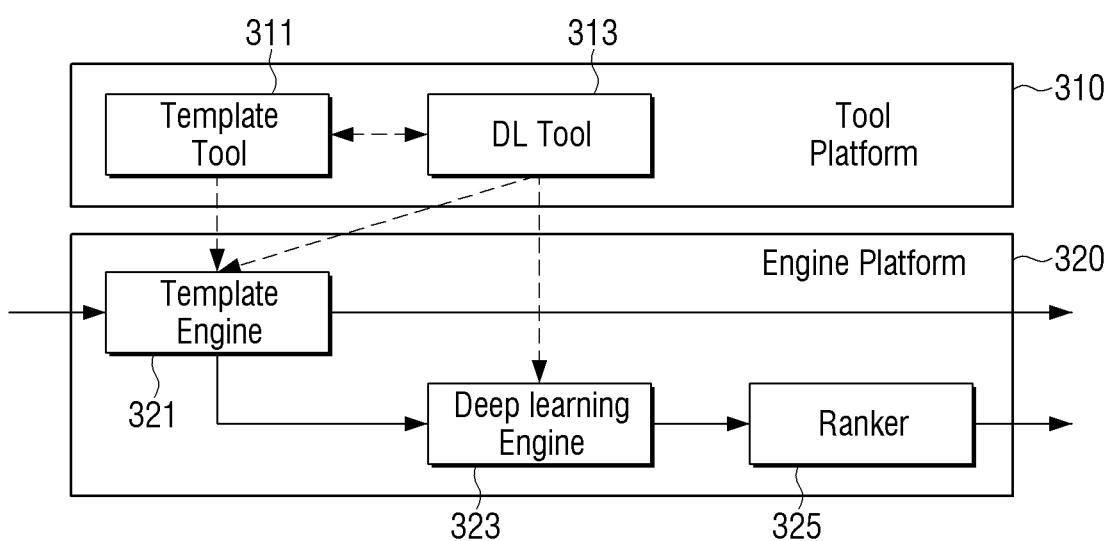
FIG. 3 is a block diagram illustrating a configuration included in a natural language generator according to an embodiment of the disclosure.

FIG. 3 is a block diagram illustrating a configuration included in a natural language generator according to an embodiment of the disclosure. As illustrated in FIG. 3, the natural language generator 240 may include a tool platform 310 and an engine platform 320.

The tool platform 310 may include a template tool 311 for generating a natural language and a deep-learning tool (DL tool) 313 that generates and trains the artificial intelligence model. The template tool 311 may include at least one pre-made natural language generation template. The natural language generation template may be made in advance by the user, but this is merely one embodiment, and may be made through the artificial intelligence model stored in the DL tool 313.

The engine platform 320 may generate (or obtain) a natural language corresponding to the input data by using one of the natural language generation template and the artificial intelligence model stored by the tool platform 310. Specifically, the engine platform 320 may include a template engine 321, a deep learning engine 323, and a ranker 325. The template engine 321 may identify whether a natural language generation template corresponding to the input data including the plurality of slots is present. If a natural language generation template corresponding to the input data is present, the template engine 321 may generate a natural language corresponding to the input data by using the natural language generation template corresponding to the input data. If a natural language generation template corresponding to the input data is not present, the deep learning engine 323 may obtain a natural language corresponding to the input data by using the artificial intelligence model. The ranker 325 may then calculate a score on the natural language obtained by the deep learning engine 323. If the calculated score is greater than or equal to a predetermined value, the ranker 325 may output the natural language obtained by the deep learning engine 323 as a response.

Figure 4:
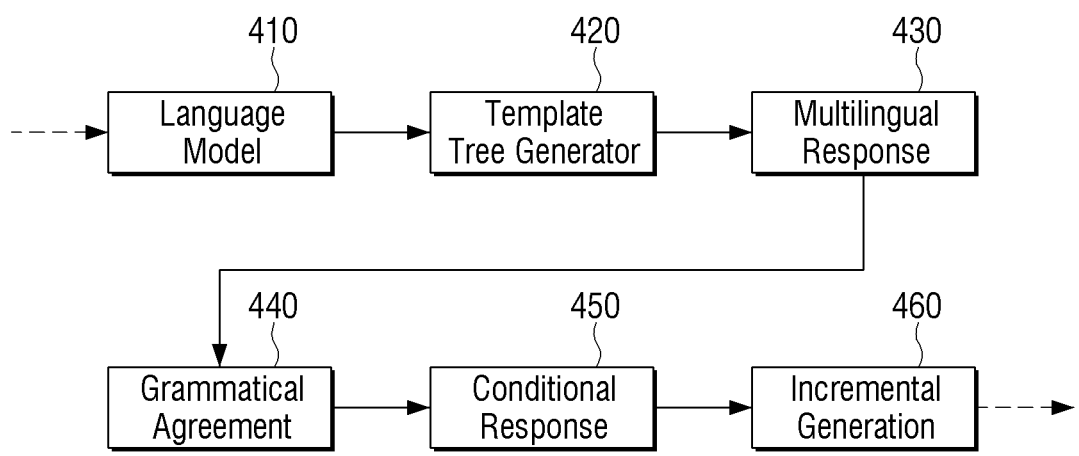
Figure 5:
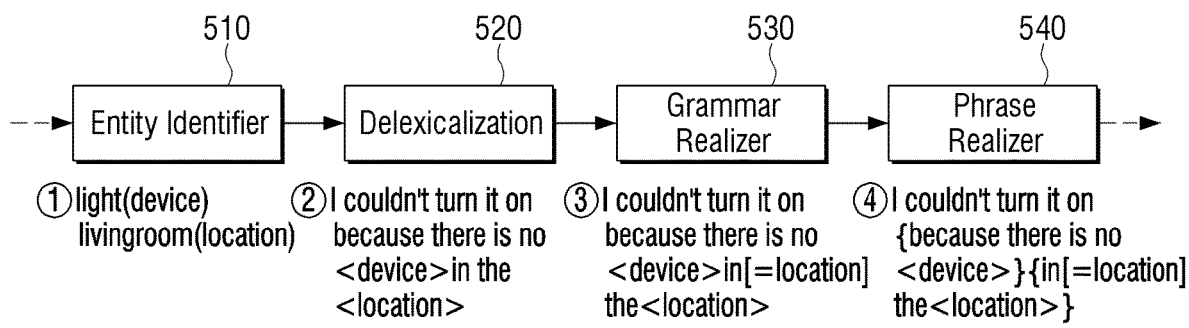

FIGS. 4 to 6 are diagrams will be described below as illustrating a tool platform 310 included in a natural language generator according to an embodiment of the disclosure.

The tool platform 310 may include a tool capable of easily and quickly inputting the natural language generation template. According to an embodiment, the tool platform 310 may support a multilingual input by setting a language option based on user input. That is, the tool platform 310 may be universally applied for all languages or adjusted to fit each language based on the characteristics of each language. For example, the tool platform 310 may be set to Korean and English based on user input.

Specifically, the tool platform 310 may select a language model set by the user input (410).

<Template Tree Generator>(420)

The tool platform may then generate a tree indicating a template required in the input data based on consensus standards such as intent, state, entity, and result of execution according to a dialogue policy. According to an embodiment, the tool platform 310 may support five states such as success, fail, confirm, select and slot filling Basically, the tool platform 310 may generate two states of success and fail. In addition, the tool platform 310 may subdivide a fail state to "no.device," "no.response," "already.on," and the like. In addition, the "confirm" state may be used to request user confirmation prior to execution, the "select" state may be used to select at least one entity, and the "slot filling" state may be used to fill a mandatory entity.

TABLE 1

| Intent | turn.on Exe. Type | ☑ Confirmation Webhook | |
|---|---|---|---|
| Entity | Mandatory | Multiple | Reuse |
| device | ☑ | ☑ | ☑ |
| location | ☐ | ☐ | ☑ |
| count(o) | ☐ | ☐ | ☐ |
| Errors | | no.device no.response duplicated.device already.on | |

Table 1 above shows an example of possible tasks for a user utterance such as "turn on the light in the living room." The "turn.on" may be confirmed as intent, and the "light" and the "living room" may be confirmed as entity, and the "count" may be confirmed as slot value from the execution result. In addition, the execution result may be changed based on whether the light is successfully turned on. According to an embodiment, fail reasons such as below may be present.

1. No light present.
2. No response from the light controller.
3. Light is present at a plurality of spaces such as the living and the master bedroom, and a plurality of space options cannot be confirmed.
4. Light is already turned-on.
5. No light in living room, but light is present in master bedroom.

The above-described case may be defined while setting the intent and establishing the expected execution result. According to an embodiment, the tool platform 310 may generate a template tree filled with the entity.

<Multilingual Response>(430)

The tool platform 310 may generate a multi-lingual response. For example, the tool platform 310 may receive input of a representative sentence that may be expressed in a natural language in which the entity on each intent and state is included. For example, the tool platform 310 may, if the intent is "turn.on" and if "I couldn't turn it on because there is no light in the living room" is received in English as a representative sentence on a fail state of "no.device," receive input of "light could not be turned on because there is no light in the living room" in Korean.

The tool platform may automatically extract "light" and "living room" as an entity by processing a sentence classifying the entity, number, subject, verb, noun, preposition, and postposition. In addition, the tool platform 310 may confirm a removable phrase if necessary. The tool platform 310 may automatically customize even in cases of failed automatic extraction.

<Grammatical Agreement>(440)

The grammatical agreement may undergo the process of FIG. 5.

1. The tool platform(410) may, as an entity, use the natural language understanding module to extract "lighting" and "living room" which are tagged entities such as <device> and <location> (510).

2. The tool platform (410) may perform a delexicallization (or templated) operation of substituting the "lighting" and "living room" with <device> and <location> which may be substituted to different words (520). The operation may be one of the methods to reduce time and effort when obtaining template or collecting learning data.

3. The tool platform (410) may confirm grammar and add a tag (530). For example, based on the location being a specific space, country, name of city, floor. Or the like, a tag of "[preposition=location]" may be added to change the preposition "in" to a "on" or "at." That is, if one or more location is present in a sentence, the grammar realizer may add information such as "[preposition=location(2)]." This means the "in" may be changed based on the <location> that follows the "in [preposition=location(2)]."

4. The tool platform (410) may confirm the phrase and add a square bracket to prevent the generation of an awkward sentence. For example, if the "device" and/or "location" information was not transferred, it may be necessary to generate a sentence with the phrase within the square bracket deleted such as "I could not turn it on [because there is no light in the living room]", "I couldn't turn it on [because there is no light] in the living room" or "I couldn't turn it on because there is no light [in the living room]." In this method, #3 may be required without the input of #1 and #2 illustrated in Table 2 below. Alternatively, #4 may be input together with #1 and #2 for a more descriptive expression.

TABLE 2

| # | Response |
|---|---|
| 1 | I couldn't turn it on. |
| 2 | I couldn't turn it on {because there is no light}. |
| 3 | I couldn't turn it on {because there is no light{in the living room}}. |
| 4 | I couldn't turn it on {the light {in the living room}}. |

<Conditional Response>(450)

FIG. 6 shows a graphical user interface (GUI) for a conditional response result, and illustrates one or more information ("[hide(hour=0)]"). In an embodiment, for a question of "how long will it take?" a response of "it remains 1 hour and 30 minutes" may be obtained. However, since "it remains 0 hour and 30 minutes" or "it remains 1 hour and 0 minutes" is not a correct response, "[hide(hour=0)]" or "[hide(min=0)]" may be added to remove "0 hour" or "0 minute" to generate a sentence.

<Incremental Generation>(460)

The tool platform 310 may, as illustrated in Table 3, increase the number of templates exponentially. The number of required templates may be determined based on the intent, state, and the number of slots included in the template. Specifically, the number may be determined by the number of slots included in the template.

TABLE 3

| | A numbers of templates | |
|---|---|---|
| A count of delexicalized slots (n) | General Case($2^n - 1$) (1) | Limited up to 5 slots ($\Sigma_{i-1}\,_n^5 C_i$) (2) |
| 1 | 1 | 1 |
| 2 | 3 | 3 |
| 3 | 7 | 7 |
| ... | ... | ... |
| 10 | 1023 | 637 |
| 11 | 2047 | 1023 |
| 12 | 4095 | 1585 |
| ... | ... | ... |

The (1) in the equation below may be an equation for calculating the number of templates required in general when the number of slots is a n-number, and the (2) may be an equation for calculating the number of templates required when the number of slots included in a sentence is limited to 5.

Equation 1

$$N_{template} \cong (2^n - 1) \times N_{intent} \times N_{state} \quad (1)$$
$$_{(n \geq 1)}$$

$$N_{template} \cong \sum_{i=1_n}^{5} C_i \times N_{intent} \times N_{state} \quad (2)$$
$$_{(6 > S_n \geq 1)}$$

Luckily, there are not many cases requiring 5 or more slots within a sentence in a communication between an actual computer and a human. Accordingly, the number of required templates may be less than 5 slots. Table 4 below illustrates rare examples of requiring 5 or more slots.

TABLE 4

| Input | send.photo(state = "confirm"; count = "14"; plural = "true"; location.place = "downtown"; location.country = "the U.S."; date="last week"; sharevia = "SMS"Isend.to = "Mon") |
|---|---|
| output | There are 14 photos taken at downtown in the U.S. last week and ready to send them via SMS to Mom. Please check and confirm to send. |

However, because various potential intent, number of slots included in a template, and at least 3 to 5 states may be present, the number of required templates may increase. That is, numerous templates may be necessary to generate sentences of various cases.

For example, if there are twenty intent (e.g., on, off, up, down, right, left, open, close, set, show, send, start, activate, deactivate, play, stop, pause, etc.) present, three states (e.g., success, fail, slot filling, etc.) present, and six slots present in a template, the number of required templates may be 98860, even if fail cases, slot filling, and various other cases are excluded. [Equation 2] below is an equation necessary in calculating the required template.

Equation 2

$$N_{template \atop (6>S_n\geq 1)} = \left(\sum_{i=1}^{5}{}_{entity} C_i \times N_{intent}\right) \quad (3)$$

$$+ \left(\sum_{i=1}^{5} N_{entity} C_i \times N_{fail}\right) \quad (4)$$

$$+ \left(\sum_{i=1}^{5} N_{entity} C_i \times N_{mandatory}\right) \quad (5)$$

As described above, because of the difficulty in generating and managing all necessary templates, the tool platform 310 may use an artificial intelligence model trained by deep learning to generate a template.

1. As in $S_1$ and $S_2$, a combined list of a template including one or two allocated slots may be generated. For example, if 5 slots of a,b,c,d,e is included, a total 15 combinations of a,b,c,d,ab,ac,ad,ae,bc,bd,be,cd,ce,de may exist.
2. A learning data may be generated using a thesaurus, Wordnet, and the like.
3. An artificial intelligence model may be generated (or trained) using learning data.
4. A sentence combination including 3 slots with $S_3$ additionally allocated may be generated using the artificial intelligence model. The possible combinations may be abc, abd, abe, acd, ace, ade, bcd,bce,bde,cde.
5. The generated sentences may be generated with a template.
6. A template including an n-number of slots may be generated by repeating operations such as 2 and 5. For example, in order to generate a sentence including 3 slots, a may be yesterday (a=yesterday), b may be SMS (b=SMS), and c may be Mom (c=Mom), and if the intent is "send.photo" and the state is a "success," the tool platform 310 may use a combination such as ab, ac,bc corresponding to "#1,#2,#3" illustrated in Table 5 below to generate 3 sentences. Then, the tool platform 310 may use deep learning to generate a sentence of abc combination corresponding to #4 of Table 5.

TABLE 5

| # | In | send.photo(date = "yesterday"; via = "SMS") |
|---|---|---|
| 1 | Out | Sent.photos taken yesterday via SMS |
| # | In | send.photo(via = "SMS"; to = "Mom") |
| 2 | Out | Sent.photos via SMS to Mom |
| # | In | send.photo(date = "yesterday"; to = "Mom") |
| 3 | Out | Sent.photos taken yesterday to Mom |
| # | In | send.photo(date = "yesterday"; via = "Sms"; to = "Mom") |
| 4 | Out | Sent.photos taken yesterday via SMS to Mom |

Figure 7:
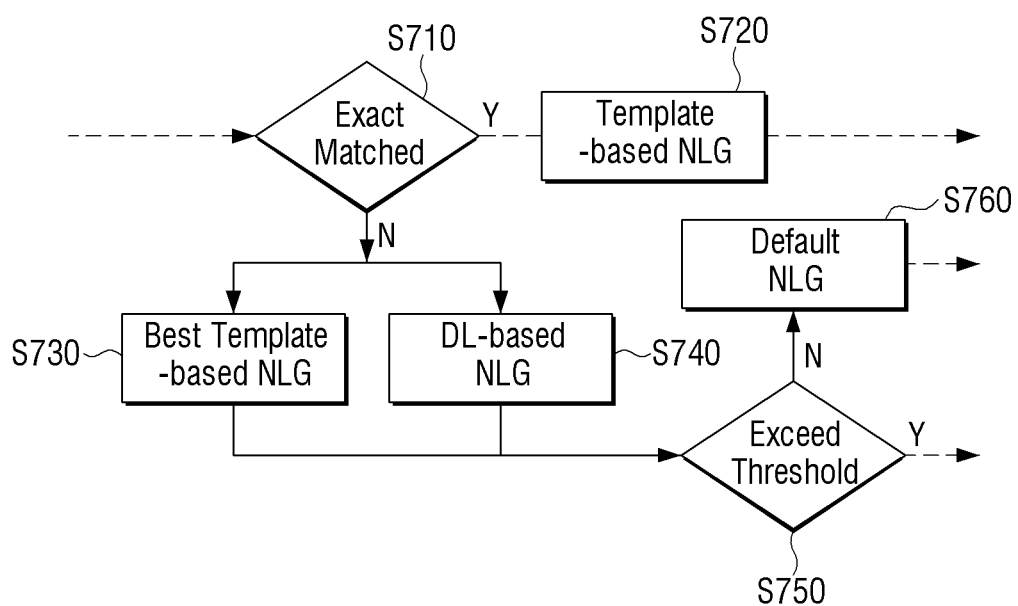
FIGS. 7 and 8 are diagrams illustrating an engine platform included in a natural language generator according to an embodiment of the disclosure.

FIG. 7 is a diagram illustrating a process of an engine platform generating a natural language included in a natural language generator according to an embodiment of the disclosure.

First, the engine platform 320 may identify whether a template matching the input data included with information on the plurality of slots is present (S710).

If a template matching the input data is present (S710—Y), the engine platform 320 may generate a natural language based on the template matching the input data (S720). The method of generating a natural language based on the template will be described in detail with reference to FIG. 8.

Figure 8:
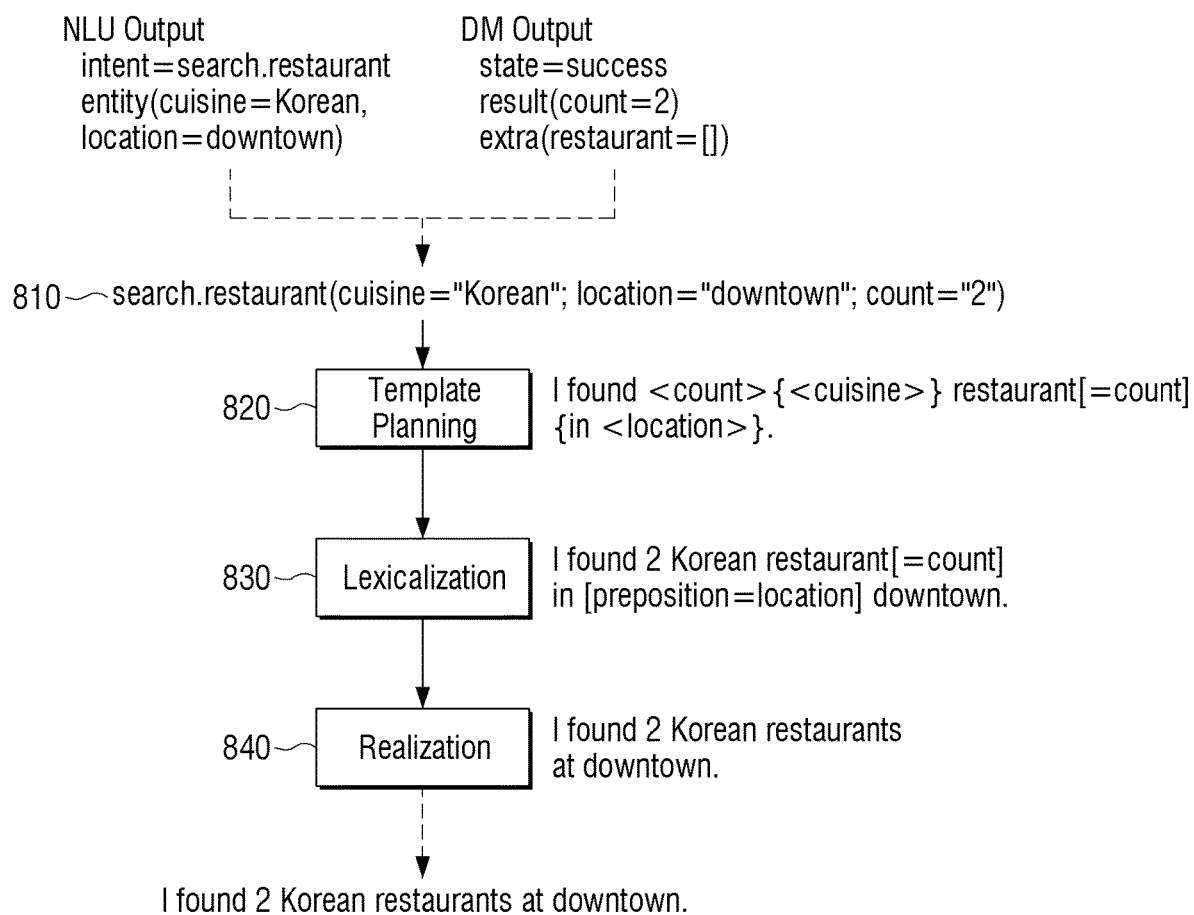

First, the engine platform 320 may obtain input data (810). The input data at this time may include information on a plurality of slots, and may be referred to as a semantic frame (SR) or a meaning representation (MR). The input data may at this time include intent, entity on the plurality of slots, and information on context, and may include the same format for multi-lingual generation. Information on intent and entity may at this time be output from the NLU part 220, and state and result may be output from the dialogue manager 230. For example, as illustrated in FIG. 8, the engine platform 320 may obtain "search. restaurant (cuisine="Korean";location="downtown";count="2")" as input data.

Then, the engine platform 320 may select a template matching the input data (820). For example, as illustrated in FIG. 8, the engine platform 320 may select I found <count>{<cuisine>}restaurant[=count] {in <location>}" as a matching template.

The engine platform 320 may input information on the slots included in the input data to the slots included in the selected template (830). This may be referred to as lexicalization. For example, the engine platform 320 may input information on the slots to the selected template and obtain the sentence, "I found 2 Korean restaurant[=count] in[preposition=location] downtown."

The engine platform 320 may perform a grammar processing process based on the set language characteristics (840). For example, the engine platform 320 may perform grammar processing on the sentence obtained in step 830 to obtain "I found 2 Korean restaurants at downtown."

Then, the engine platform 320 may output the natural language obtained through the template as TTS 250.

However, if a template matching the input data is not present (S710—N), the engine platform 320 may use a template being most similar to the template matching the input data among the pre-stored templates to generate a natural language (S730), and use the artificial intelligence model trained through deep learning to generate a natural language (S740). If a natural language using an artificial intelligence model is generated, the engine platform 320 may undergo a post-processing process of modifying grammatical expressions.

Then, the engine platform 320 may calculate the scores on the natural language generated through the S730 process and the natural language generated through the S740 process. The scores may be a credibility value on the natural language generated through the S730 process and the natural language generated through the S740 process.

Then, the engine platform 320 may compare each score on the natural language generated through the S730 process and the natural language generated through the S740 process to identify whether each score exceeded a threshold value (S750).

If at least one of the scores for the natural language generated through the S730 process and the natural language generated through the S740 process exceeds the threshold value (S750—Y), the engine platform 320 may output the natural language with the high score between the natural language generated through the S730 process and the natural language generated through the S740 process as TTS 250.

If both scores for the natural language generated through the S730 process and the natural language generated through the S740 process is less than or equal to the threshold value (S750—N), the engine platform 320 may output the defaulted sentence as TTS 250 (S760). For example, the defaulted sentence may be a general sentence such as "the operation requested by the user has been processed" and "the operation requested by the user has failed."

As described above, by generating a natural language using one of (natural language generation) template and an artificial intelligence model, a natural response to various cases may be provided even if a template with little electronic device 100 is stored.

Figure 9:
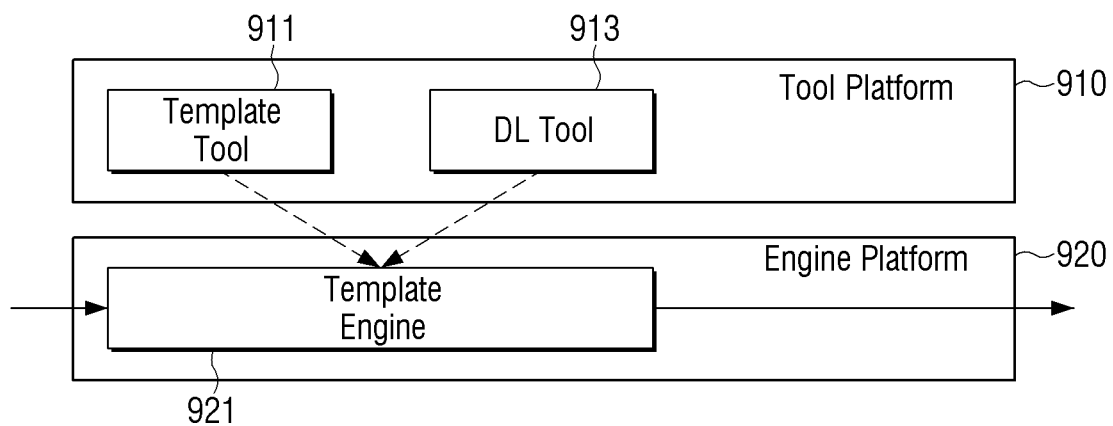
FIG. 9 is a block diagram illustrating a configuration included in a natural language generator according to another embodiment of the disclosure.

FIG. 9 is a block diagram illustrating a configuration included in a natural language generator according to another embodiment of the disclosure. Specifically, the natural language generator 240 may include a tool platform 910 and an engine platform 920.

The tool platform 910 may include a platform tool 911 and a deep learning (DL) tool 913. The DL tool 913 may at this time generate a sentence with the method as described in FIGS. 3 to 6. Then, the DL tool 913 may generate a natural language generation template by templating (or delexicalization) at least one entity of the generated sentences.

That is, if a natural language generation template including n-number of slots is stored in the template tool 911, the DL tool 913 may use the artificial intelligence model to generate a sentence including n+1-number of slots, and the n+1-number of slots may be template (or delexicalization) to generate the natural language generation template. The DL tool 913 may generate a natural language generation template for various cases including a plurality of slots using the above-described method. Then, the template tool 911 may store the natural language generation template for various cases generated by the DL tool 913.

Then, the engine platform 920 may use the pre-made natural language generation template stored in the template tool 911 or the natural language generation template made by the DL tool 913 to generate and output a natural language corresponding to input data (921).

That is, the DL tool 913 may obtain a natural language generation template by using an artificial intelligence model and not training an artificial intelligence model for generating a natural language.

Figure 10A:
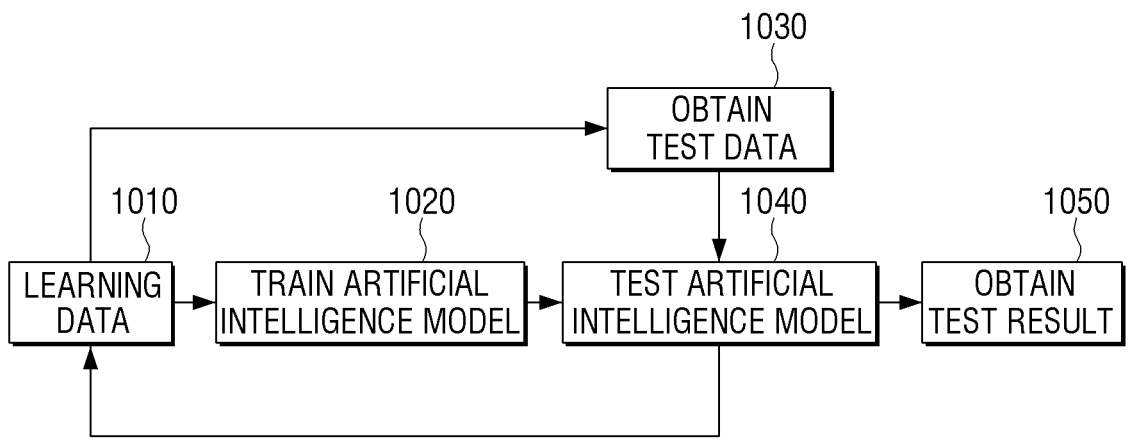
FIGS. 10A to 10C are diagrams illustrating a method of training an artificial intelligence model for obtaining a natural language according to an embodiment of the disclosure.

FIG. 10A is a diagram illustrating a method of training an artificial intelligence model for obtaining a natural language according to an embodiment of the disclosure.

First, the electronic device 100 may obtain learning data (1010). The learning data may be a sentence generated with a semantic frame including information on a n-number of slots and information on n-number of slots.

The electronic device 100 may use learning data to train the artificial intelligence model (1020). Accordingly, when input data including information on a n-number of slots is input, the trained artificial intelligence model may generate a sentence corresponding to input data including information on a n-number of slots.

The electronic device 100 may generate test data (1030). The test data may be a sentence corresponding to a semantic frame including information on a n+1-number of slots and information on a n+1-number of slots. The test data may at this time be input manually by a user, or may be obtained by using a separate automatic sentence generation module.

The electronic device 100 may test the artificial intelligence model by using a test data (1040). Specifically, the electronic device 100 may input the semantic frame including information on the n+1-number of slots included in the test data to the artificial intelligence model to obtain a sentence corresponding to information on the n+1-number of slots. Because the artificial intelligence model only performed training on the n-number of slots, a plurality of sentences corresponding to information on the n+1-number of slots may be obtained.

The electronic device 100 may obtain test results based on the sentence corresponding to information on the n+1-number of slots included in the test data and the sentence obtained through the artificial intelligence model. That is, the electronic device 100 may obtain test results by obtaining a sentence identical or similar with the sentence corresponding to information on the n+1-number of slots included in the test data of the plurality of characters obtained through the artificial intelligence model.

Then, the electronic device 100 may again input the test result (that is, information on the n+1-number of slots and sentences generated thereof) as the learning data and train the artificial intelligence model.

As described above, by repetitively performing steps 1010 to 1050, the electronic device 100 may generate a sentence for the input data including information on n, n+1, n+2 . . . number of slots.

Figure 10B:
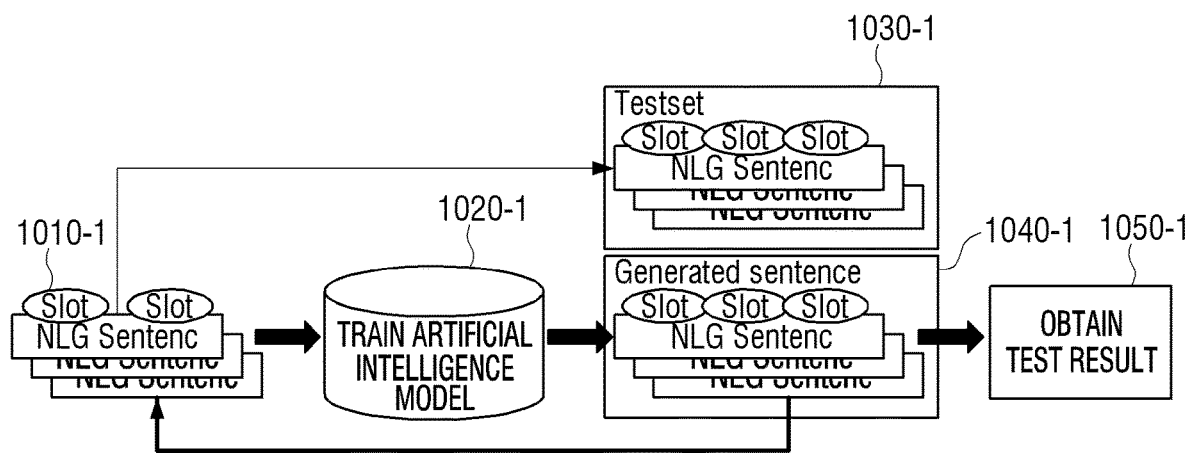
Figure 10C:
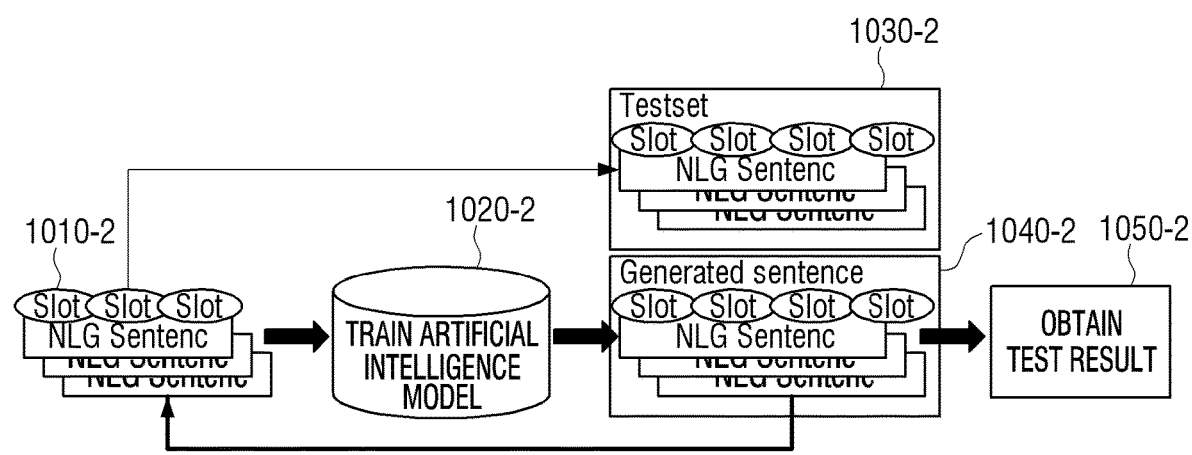

FIGS. 10B and 10C are diagrams illustrating a specific method of training an artificial intelligence model for obtaining a natural language according to an embodiment of the disclosure.

As illustrated in FIG. 10B, the electronic device 100 may obtain learning data (1010-1). The learning data may be information on 2 slots and a sentence corresponding thereto. For example, if a,b,c,d is present in a slot, the learning data may be information on each of a, b, c, d, a+b, a+c, a+d, b+c, b+d, c+d and a sentence corresponding thereto.

The electronic device 100 may use the obtained learning data to train the artificial intelligence model (1020-1). The trained artificial intelligence model may obtain a sentence corresponding to input data including 2 or less slots.

The electronic device 100 may obtain test data on 3 slots (1030-1). For example, the test data may be information on each of a+b+c, a+b+d+, a+c+d, b+c+d and a sentence corresponding thereto. The test data may at this time be input by the user, but this is merely one embodiment, and may be obtained using a separate automatic sentence generation module.

The electronic device 100 may obtain a plurality of sentences by inputting information on 3 slots included in the test data to the artificial intelligence model (1040-1).

Then, the electronic device 100 may obtain a test result by comparing the plurality of sentences input by the artificial intelligence model and the sentence included with the test data (1050-1).

The electronic device 100 may obtain information on 3 slots and the sentence corresponding thereto as learning data.

That is, as illustrated in FIG. 10C, the electronic device 100 may obtain learning data (1010-2). The learning data may be information on 3 slots and a sentence corresponding thereto, and may be obtained through the method described in FIG. 10A.

The electronic device 100 may use the obtained learning data to train the artificial intelligence model (1020-2). The trained artificial intelligence model may obtain a sentence corresponding to input data including 3 slots.

The electronic device 100 may obtain test data on 4 slots (1030-2). For example, the test data may be information on a+b+c+d and a sentence corresponding thereto. The test data may at this time be input by the user, but this is merely one embodiment, and may be obtained using a separate automatic sentence generation module.

The electronic device 100 may input information of the 4 slots included in the test data to the artificial intelligence model to obtain a plurality of sentences (1040-2).

Then, the electronic device 100 may compare the plurality of sentences input by the artificial intelligence model and the sentence included in the test data and obtain the test results (1050-2).

The electronic device 100 may obtain information of 4 slots and a sentence corresponding thereto as learning data.

That is, by obtaining learning data of n+1-number of slots using the artificial intelligence model trained on the n-number of slots in the same method as described in FIGS. 10B and 10C, the electronic device 100 may input information on a multiple number of slots and generate a natural language sentence.

In addition, the electronic device 100 may use the sentence obtained based on test results to obtain the natural language generation template. Specifically, the electronic device may use the artificial intelligence model trained on n-number of slots to obtain a sentence corresponding to n+1-number of slots. Then, the electronic device 100 may delexicalize the obtained sentence to obtain the natural language generation template on the n+1-number of slots. That is, the electronic device 100 may use the artificial intelligence model trained on the n-number of slots to obtain the natural language generation template with n+1-number of slots.

Figure 11:
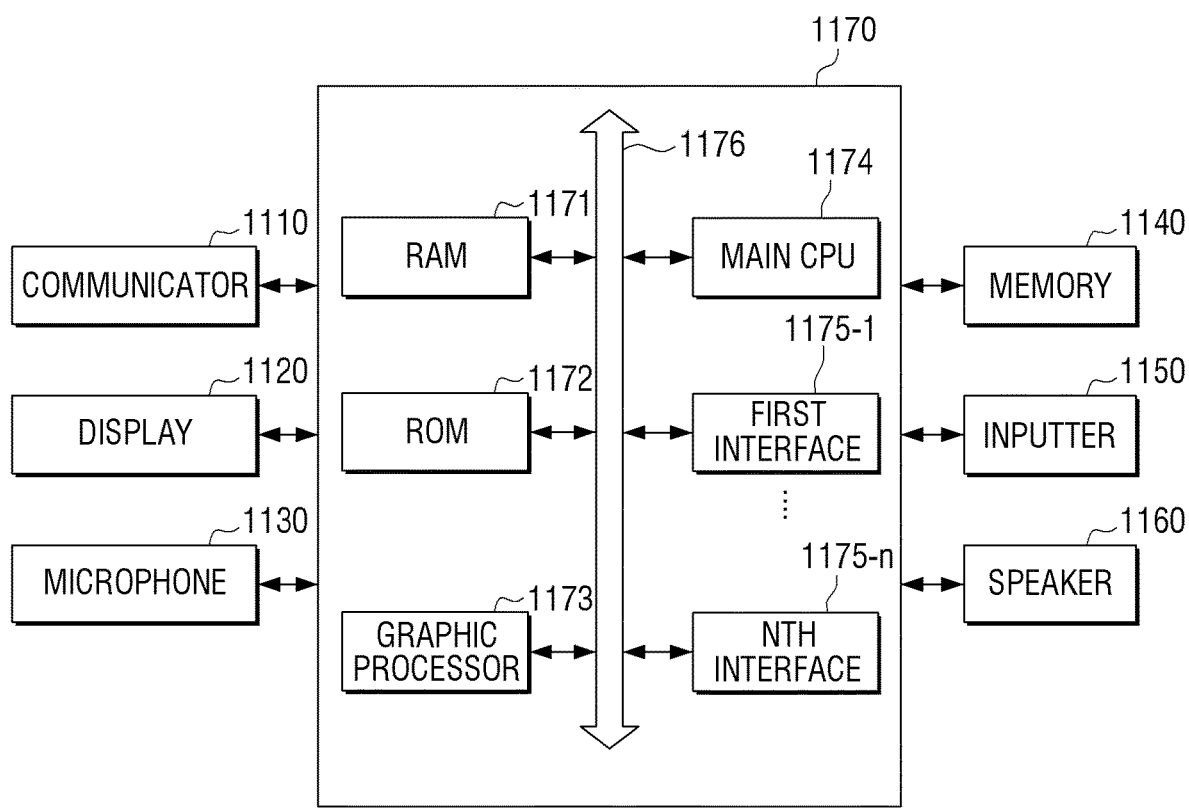
FIG. 11 is a block diagram illustrating in detail a configuration of an electronic device according to an embodiment of the disclosure.

FIG. 11 is a block diagram illustrating in detail a configuration of an electronic device according to an embodiment of the disclosure. As illustrated in FIG. 11, the electronic device may include a communicator 1110, a display 1120, a microphone 1130, a memory 1140, an inputter 1150, a speaker 1160, and a processor 1170.

The communicator 1110 may perform communication with external devices of various types based on the communication methods of various types. The communicator 110 may include one of a Wi-Fi chip, a Bluetooth chip, a wireless communication chip, or an NFC chip. The processor 1170 may use the communicator 1110 to perform communication with an external server or various external devices.

Specifically, the communicator 1110 may perform communication with the external server that stores the artificial intelligence model trained to obtain a natural language. That is, the communicator 110 may transmit input data including information on a plurality of slots to the external server, and may receive information on the natural language corresponding to input data obtained through the artificial intelligence model from the external server.

The display 1120 may display an image data processed in the image processor (not shown) in a display area (or, display). The display area may refer to at least a part of the display 1120 exposed at one surface of a housing of the electronic device 100. The at least a part of the display 1120 may be combined to at least one of the front surface area, the side surface area, and the back surface area of the electronic device 100 in a flexible display form. The flexible display may be characterized by being able to curve, bend or roll a substrate which is thin and flexible as a paper without damage.

The microphone 1130 may obtain a user speech. Specifically, the microphone 1130 may be provided in the interior or the electronic device 100, but this is merely one embodiment, and may be provided externally electrically coupled with the electronic device 100.

The memory 1140 may store various programs and data necessary in the operation of the electronic device 100. The memory 1140 may be implemented as a non-volatile memory, a volatile memory, a flash-memory, a hard disk drive (HDD), a solid state drive (SSD), or the like. The memory 1140 may be accessed by the processor 1170, and a reading/recording/modifying/deleting/updating and the like of data may be performed by the processor 1170. The term memory herein may include a memory card (not shown; e.g., micro SD card, memory stick) mounted to a memory 1140, a ROM (not shown) within a processor 1170, a RAM (not shown), or an electronic device 100.

In addition, the memory 1140 may be stored with a program for configuring various screens to be displayed in the display area of the display 1120, data, and the like. In addition, the memory 1140 may also store the various artificial intelligence models of the disclosure.

The inputter 1150 may receive various user input and transfer to the processor 1170. The user inputter 1150 may include, for example, a touch panel, (digital) pen sensor or a key. The touch panel may use at least one method of, for example, a capacitive, a resistive, an infrared method, or an ultrasonic wave method. In addition, the touch panel may further include a control circuit. The touch panel may further include a tactile layer, and may provide a tactile response. The (digital) pen sensor may be, for example, a part of a touch panel or may include a separate sheet for recognition. The key may include, for example a physical button, an optical key, or a keypad.

The speaker 1160 may be configured to out only output various audio data in which various processing operations such as decoding or amplification, and noise filtering have been performed by the audio processor (not shown), but also various alarm sounds or voice messages. Specifically, the configuration outputting audio may be implemented as a speaker 1160, but this is merely one embodiment, and may be implemented as an output terminal capable of outputting audio data.

Specifically, the speaker 1160 may output the natural language obtained through the natural language generator 240 as a voice message through TTS 250.

The processor 1170 (or, controller) may use the various programs stored in the memory 1140 to control the overall operations of the electronic device 100.

The processor 1170 may be configured to a RAM 1171, a ROM 1172, a graphic processor 1173, a main CPU 1174, a first to n-th interface (1175-1 to 1175-n), and a BUS 1176. The RAM 1171, the ROM 1172, the graphic processor 1173, the main CPU 1174, the first to n-th interface (1175-1 to 1175-n), and the like may be coupled with one another through the BUS 1176.

Figure 12:
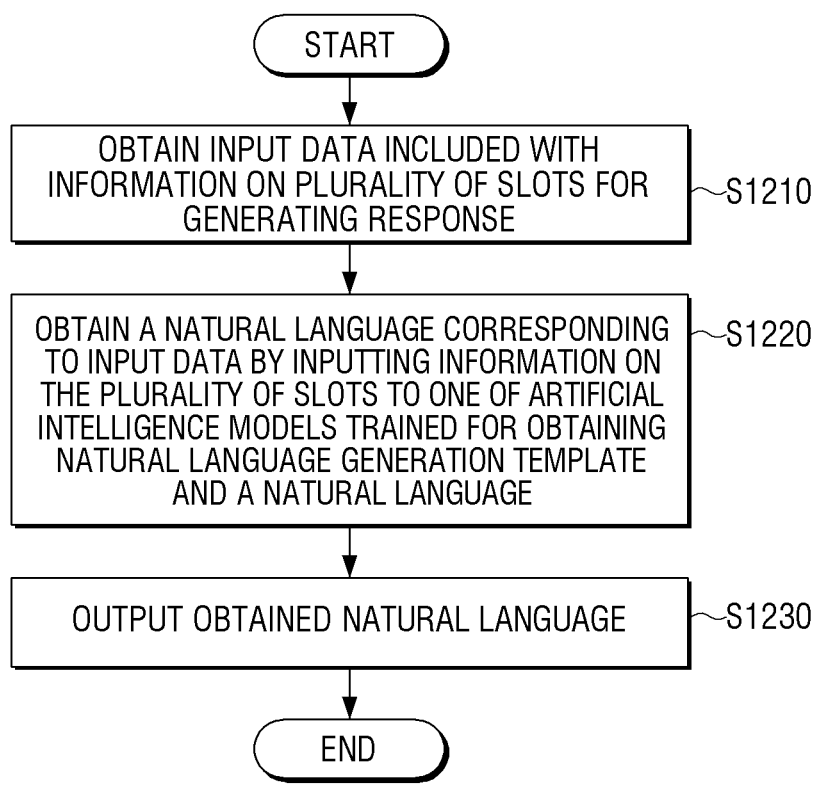
FIG. 12 is a flow chart illustrating a natural language generation method of an electronic device according to an embodiment of the disclosure.

FIG. 12 is a flow chart illustrating a natural language generation method of an electronic device according to an embodiment of the disclosure.

First, the electronic device 100 may obtain input data including information on the plurality of slots required to generate a response (S1210).

The electronic device 100 may obtain a natural language corresponding to input data by inputting information on the plurality of slots to one of artificial intelligence models trained for obtaining natural language generation template and a natural language (S1220). Specifically, the electronic device 100 may identify whether a natural language generation template corresponding to the input data is present based on information on the plurality of slots. If a natural language generation template corresponding to input data is present, the electronic device 100 may use the natural language generation template to generate a natural language for the input data, and if a natural language generation template corresponding to input data is not present, the electronic device 100 may input information on the plurality of slots to the artificial intelligence model to obtain a natural language for the input data.

Then, the electronic device 100 may output the obtained natural language (S1230). Specifically, the electronic device 100 may use TTS to output the obtained natural language as a voice message.

The terms "part" or "module" used in the disclosure may include a unit configured as a hardware, software, or firmware, and may be used interchangeably with terms such as, for example, logic, logic blocks, parts, or circuits. "Part" or "module" may be a part integrally formed or a minimum unit or a part of the part performing one or more functions. For example, a module may be configured to the form of an application-specific integrated circuit (ASIC).

One or more embodiments may be implemented with software including instructions stored in a machine-readable storage media (e.g., computer). The machine may call an instruction stored in the storage medium, and as a device capable of operating according to the called instruction, may include an electronic device (e.g., electronic device 100) according to embodiments. Based on the instruction being executed by the processor, the processor may directly or under the control of the processor perform a function corresponding to the instruction using different elements. The instructions may include a code generated by a compiler or executed by an interpreter. The machine-readable storage media may be provided in the form of a non-transitory storage medium. Herein, "non-transitory" merely means that the storage medium is tangible and does not include a signal and does not distinguish that data is permanently or temporarily stored in the storage medium.

According to an embodiment, a method according to one or more embodiments may be provided in a computer program product. The computer program product may be exchanged between a seller and a purchaser as a commodity. The computer program product may be distributed in the form of a machine-readable storage medium (e.g., a compact disc read only memory (CD-ROM)) or distributed online through an application store (e.g., PLAYSTORE™). In the case of online distribution, at least a portion of the computer program product may be at least stored temporarily in a storage medium such as a manufacturer's server, a server of an application store, or a memory of a relay server, or temporarily generated.

Each of the elements (e.g., a module or a program) according to various embodiments may be composed of a single entity or a plurality of entities, and some sub-elements of the abovementioned sub-elements may be omitted, or different sub-elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, omitted or a different operation may be added.

What is claimed is:

1. A natural language generating method of an electronic device, the method comprising:
    obtaining input data with information on a plurality of slots included for generating a response;
    obtaining a natural language corresponding to the input data by inputting the information on the plurality of slots to one of artificial intelligence models trained for obtaining a natural language generation template and a natural language; and
    outputting the obtained natural language,
    wherein the obtaining of the natural language comprises:
        identifying whether a natural language generation template corresponding to the input data is present based on information on the plurality of slots;
        based on a natural language generation template corresponding to the input data being present, using the natural language generation template to obtain a natural language for the input data; and
        based on a natural language generation template corresponding to the input data not being present, obtaining a natural language for the input data by inputting information on the plurality of slots to an artificial intelligence model.

2. The natural language generation method of claim 1, wherein the obtaining comprises:
    based on a natural language generation template corresponding to the input data not being present, using a similar template being most similar with a natural language generation template corresponding to the input data among pre-stored natural language generation templates to obtain a first natural language for the input data;
    inputting information on the plurality of slots to an artificial intelligence model to obtain a second natural language for the input data; and
    calculating scores on the first natural language and the second natural language and obtaining a natural language of a high score between the first natural language and the second natural language as a natural language for the input data.

3. The natural language generation method of claim 2, wherein the obtaining comprises:
    based on scores on the first natural language and the second natural language both being less than a threshold value, using a defaulted natural language generation template to obtain a natural language for the input data.

4. The natural language generation method of claim 1, wherein the artificial intelligence model is trained by using learning data including a number of slots greater than an n-number of slots included in the natural language generation template to obtain a natural language on learning data including a number of slots greater than the n-number of slots.

5. The natural language generation method of claim 1, wherein the natural language generation template is generated by inputting learning data including information on an n-number of slots to the artificial intelligence model for the natural language on the obtained learning data to be templated.

6. An electronic device, comprising:
    a memory comprising at least one instruction; and
    a processor configured to control the electronic device coupled to the memory,
    wherein the processor is configured to:
        based on executing at least one instruction, obtain input data included with information on a plurality of slots for generating a response,
        identify whether a natural language generation template corresponding to the input data is present based on information on the plurality of slots,
        based on a natural language generation template corresponding to the input data being present, obtain a natural language for the input data using the natural language generation template, based on a natural language generation template corresponding to the input data not being present, obtain a natural language for the input data by inputting information on the plurality of slots to an artificial intelligence model, and output the obtained natural language.

7. The electronic device of claim 6, wherein the processor is configured to:

based on a natural language generation template corresponding to the input data not being present, use a similar template being most similar with the natural language generation template corresponding to the input data among pre-stored natural language generation templates to obtain a first natural language for the input data, input information on the plurality of slots to an artificial intelligence learning model to obtain a second natural language for the input data, and calculate scores on the first natural language and the second natural language to obtain a natural language of a high score between the first natural language and the second natural language as a natural language for the input data.

8. The electronic device of claim 6, wherein the processor is configured to, based on the scores on the first natural language and the second natural language both being less than a threshold value, use a defaulted natural language generation template to obtain a natural language for the input data.

9. The electronic device of claim 6, wherein the artificial intelligence model is trained by using learning data including a number of slots greater than n-number of slots included in the natural language generation template to obtain a natural language on learning data including a number of slots greater than the n-number of slots.

10. The electronic device of claim 6, wherein the natural language generation template is generated by inputting learning data including information on an n-number of slots to the artificial intelligence model for the natural language on the obtained learning data to be templated.

11. A non-transitory computer readable recording medium storing programs for executing a method of generating a natural language, the method comprises:

obtaining input data included with information on a plurality of slots for regenerating a response;

obtaining a natural language corresponding to the input data by inputting the information on the plurality of slots to one of artificial intelligence models trained for obtaining a natural language generation template and a natural language; and outputting the obtained natural language, wherein the obtaining comprises:

identifying whether a natural language generation template corresponding to the input data is present based on information on the plurality of slots;

based on a natural language generation template corresponding to the input data being present, using the natural language generation template to obtain a natural language for the input data; and based on a natural language generation template corresponding to the input data not being present, obtaining a natural language for the input data by inputting information on the plurality of slots to an artificial intelligence model.

* * * * *